US011250842B2

(12) United States Patent
Kim (10) Patent No.: US 11,250,842 B2
(45) Date of Patent: Feb. 15, 2022

(54) MULTI-DIMENSIONAL PARSING METHOD AND SYSTEM FOR NATURAL LANGUAGE PROCESSING

(71) Applicant: Min Ku Kim, Little Ferry, NJ (US)

(72) Inventor: Min Ku Kim, Little Ferry, NJ (US)

( * ) Notice: Subject to any disclaimer, the term of this patent is extended or adjusted under 35 U.S.C. 154(b) by 186 days.

(21) Appl. No.: 16/773,270

(22) Filed: Jan. 27, 2020

(65) Prior Publication Data

US 2020/0243076 A1 Jul. 30, 2020

Related U.S. Application Data

(60) Provisional application No. 62/797,314, filed on Jan. 27, 2019.

(51) Int. Cl.

| | | |
|---|---|---|
| *G10L 15/19* | (2013.01) | |
| *G06F 16/33* | (2019.01) | |
| *G10L 15/22* | (2006.01) | |
| *G10L 15/18* | (2013.01) | |
| *G10L 13/00* | (2006.01) | |
| *G06F 40/30* | (2020.01) | |
| *G06F 40/211* | (2020.01) | |

(Continued)

(52) U.S. Cl.
CPC .......... *G10L 15/19* (2013.01); *G06F 16/3344* (2019.01); *G06F 40/211* (2020.01); *G06F 40/268* (2020.01); *G06F 40/284* (2020.01); *G06F 40/30* (2020.01); *G06F 40/45* (2020.01); *G06F 40/58* (2020.01); *G10L 13/00* (2013.01); *G10L 15/1822* (2013.01); *G10L 15/22* (2013.01)

(58) Field of Classification Search
CPC ........ G06F 40/30; G06F 40/58; G06F 40/268; G06F 40/284; G06F 40/55; G06F 40/211; G06F 40/40; G06F 40/44; G06F 40/56; G06F 40/45; G06F 40/51
See application file for complete search history.

(56) References Cited

U.S. PATENT DOCUMENTS 5,270,928 A * 12/1993 Suzuki .................. G06F 40/289
704/5
5,677,835 A * 10/1997 Carbonell ............... G06F 40/10
704/8

(Continued)

FOREIGN PATENT DOCUMENTS

AU 2006222742 4/2007

OTHER PUBLICATIONS

Blackwood et al.,Multilingual Neural Machine Translation with Task-Specific Attention, IBM Research AI, 2018, Abstract, Yorktown Heights, NY, US.

*Primary Examiner* — Samuel G Neway
(74) *Attorney, Agent, or Firm* — TCP Law, PLLC (57) ABSTRACT

A method for translating a text written or otherwise communicated in a source natural language into a text written or otherwise communicable in target natural language, in reliance upon a multidimensional model, relies on determining the core concept in the sentences of the source text, and leverages the determined core concepts to create the target language translation. The method includes processing the source natural language text into sentences, then parsing the sentences, including assigning codes and/or directional operators to realize parsed sentences according to the model. The sentence models are then processed effect the actual translation to the target natural language text, and communicated.

17 Claims, 8 Drawing Sheets

(51) Int. Cl.
  *G06F 40/45* (2020.01)
  *G06F 40/268* (2020.01)
  *G06F 40/58* (2020.01)
  *G06F 40/284* (2020.01)

(56) References Cited

U.S. PATENT DOCUMENTS

| | | | |
|---|---|---|---|
| 2002/0042794 A1* | 4/2002 | Konaka | G06F 16/313 |
| 2004/0030540 A1* | 2/2004 | Ovil | G06F 40/253 |
| | | | 704/1 |
| 2004/0111272 A1* | 6/2004 | Gao | G06F 40/55 |
| | | | 704/277 |
| 2005/0177358 A1 | 8/2005 | Melomed et al. | |
| 2006/0217963 A1* | 9/2006 | Masuichi | G06F 40/47 |
| | | | 704/7 |
| 2007/0022115 A1* | 1/2007 | Warburton | G06F 40/247 |
| 2008/0086298 A1* | 4/2008 | Anismovich | G06F 40/284 |
| | | | 704/5 |
| 2009/0058860 A1 | 3/2009 | Fong et al. | |
| 2010/0121630 A1* | 5/2010 | Mende | G06F 40/30 |
| | | | 704/7 |
| 2011/0257963 A1* | 10/2011 | Zuev | G06F 40/30 |
| | | | 704/9 |
| 2013/0132065 A1* | 5/2013 | Danielyan | G06F 40/47 |
| | | | 704/3 |
| 2013/0282598 A1* | 10/2013 | Ma | G06Q 10/00 |
| | | | 705/310 |
| 2016/0048504 A1* | 2/2016 | Narayanan | G06F 40/268 |
| | | | 704/9 |
| 2017/0083510 A1* | 3/2017 | Dixon | G06F 40/47 |
| 2017/0103062 A1* | 4/2017 | Zhang | G06F 40/42 |
| 2018/0129931 A1 | 5/2018 | Bradbury et al. | |
| 2020/0243076 A1* | 7/2020 | Kim | G10L 15/19 |

* cited by examiner

MULTI-DIMENSIONAL PARSING METHOD AND SYSTEM FOR NATURAL LANGUAGE PROCESSING

CROSS-REFERENCE TO RELATED APPLICATIONS

This application derives the benefit of the filing date of U.S. Provisional Patent Application No. 62/797,314, filed Jan. 27, 2019. The contents of the provisional application are incorporated herein by reference.

COPYRIGHT

A portion of the disclosure of this patent document contains material that is subject to copyright protection. The copyright owner has no objection to the facsimile reproduction by anyone of the patent document or the patent disclosure, as it appears in the United States Patent and Trademark Office patent files or records, but otherwise reserves all copyright rights whatsoever.

BACKGROUND OF THE INVENTION

1. Field of the Invention

The invention relates to natural language translation broadly, and more specifically relates to a method for natural language translation that first processes sentences comprising a text for translation in a first or source language to realize sentence models, and then processes the sentence models to effect translation to a second or target language.

2. Background of the Related Art

Natural language is language that has evolved naturally in humans through use and repetition. Natural language processing ("NLP") helps computers communicate with humans in their own language and scales other language-related tasks. For example, NLP makes it possible for computers to read text, hear speech, interpret it, measure sentiment and determine which parts are important. Machine not only process natural language but can generate natural language. For example, AI text generators operate to generate natural language from structured data, such as a knowledge base or a logical form (linguistics) to produce documents that summarize or explain the contents of computer databases. These are used, for example in, generating news reports, summarizing medical records, generating technical manuals, product descriptions for e-commerce sites, etc. For instance, OpenAI (at https://openai.com) has developed a large-scale unsupervised transformer-based language model called GPT-2 that generates coherent paragraphs of text without task-specific training. A related website, talktotransformer.com offers and accessible version of OpenAI's GPT-2 (the term "transformer" refers to the type of neural network used by GPT-2 and other systems), where Texar, developed by Petuum, Inc., is an open-source toolkit focused on text generation through the use of TensorFlow language.

AI text generators work by processing keywords input to the application based on various grammatical rules and other instructions on how to construct sentences, phrases, essays and texts, related to the keywords. The AI text generator reconfigures the input to produce an output that appears to be a narrative written by a person. Truthful Speaking, either operating at a website linked to the AI text generator, or as a plug-in operating with and interfaced to the AI text generator, processes the AI-generated text in any of several ways.

For that matter, without understanding the natural language processing of the human brain, parsing text such as words, phrases, and sentences inside an electronic machine is limited in function, speed, and/or accuracy. Current-level machine translation is prone to generating inaccurate or unintelligible sentences. Data analysis of natural language by a machine is also limited and is not anywhere near that of human-level, hampering the development of true artificial intelligent machineries.

Machine translation ("MT") is a sub-field of computational linguistics that investigates the use of computer software to translate text or speech from one language to another. While currently-known applications readily substitute words in a first language with words of a second language, but have trouble smoothly recognizing whole phrases and their closed counterparts in the target language. Solving this problem with corpus statistical and neural techniques is a rapidly growing filed that is leading to between translations, handling differences in linguistic typology, translation of idioms and translation of anomalies.

The translation process may be described a decoding the meaning of the source text and then re-encoding the meaning in the target language. But behind this simple procedure lies a complex cognitive operation (put another way, more easily said than done). To decode the meaning of the source text in its entirety, the translator must interpret and analyze all the features of the text, a process that requires in-depth knowledge of the grammar, semantics, syntax, idioms, etc., of the source language, as well as the culture of its speakers. The translator needs the same in-depth knowledge to re-encode the meaning in the target language.

Rule-based machine translation is known to use information about the linguistics of the source and target languages, using the morphological and syntactic rules and semantic analysis of both languages. It links the structure of the input sentence with the structure of the output sentence using a parser and an analyzer for the source language, a generator for the target language, and a transfer lexicon for the actual translation. But rules-based is very "rules intensive," i.e., everything must be made explicit: orthographical variation and erroneous input must be made part of the source language analyzer in order to cope with it, and lexical selection rules must be written for all instances of ambiguity.

US Published Application Ser. No. 2010/012163 discloses a known electronic translation system employing a language-independent central representation of language to be translated. The known system relies upon a language parser to translate to the language-independent representation, and a renderer to translate from the representation to a desired language supported by the system. The known system employs what it refers to as a language independent object world, as a central hub for language translations, in which text or speech is translated from a source language into a language-independent interpretation before translating this representation into one or more destination languages for output.

A mapping is generated from the syntax and semantics of an input language to, for example, a graph in the language-independent meaning world. From this language-independent representation, the translator is said to be capable of completing the translation into any language or to many languages. The electronic translation system is said to follow common knowledge in the neurological field, recognizing that human cognition separates syntax and semantics. For example, if several people with different language understanding are sitting together and with an umbrella in a room, everyone "knows" that the object is an umbrella. But this "knowing" does not mean that the word "umbrella" is activated anywhere in a brain of a person present. When the people in the room want to reference the object, the object "umbrella" is tagged with a language-specific word. The people involved know the object without using language, but they access a "tag" for communication purposes. For instance, they could ask, "May I have this umbrella?"

SUMMARY OF THE INVENTION

The present invention provides a synapper translation model, and a method for translation, software application program, and system that rely upon the synapper model to effect translations from a source to a target model that overcome the shortcomings of, and improves the known arts, such as those systems mentioned above.

The invention relates to natural language translator that first process sentences comprising a source text for translation in accordance with a synapper model, first rules engine to realize sentence models, and then processes the sentence models to realize a translated sentence in the target language based on the sentence models.

The separation of syntax and semantics (or of languages dependent information and languages independent information), described above, is a portion of the translation process of the present disclosure. For example, when text is analyzed regarding its syntax and morphology, the grammatical structure is analyzed. This results in a basic understanding of the text. The contents of that text are extracted. For example, the text generally includes sentences which may comprise a subject, object and verb.

In one embodiment, each component can be extracted and its function within the sentence can be retrieved. These components and their relation to each other are used in processing the text into a graph. The components form nodes of the graph and the relation between the components are represented by edges.

In another embodiment, the graph can be made to be somewhat or completely independent of the language that is used with the input (or output) text. The graph mainly includes semantic information which can be straightforwardly used for further processing.

In one embodiment, the invention provides a computer algorithm mimicking the natural language processing of the human brain by implementing multi-dimensional parsing that enhances natural language processing generally, and machine translation of natural language more specifically.

In another embodiment, the invention provides a multi-dimensional model for natural language processing that attempts to mimic that of the human brain. The model implements multi-directional or multi-dimensional natural language processing to parse natural language text to effect highly accurate and/or speedier natural language translations. Presenting the translations results effectively communicates content, as written text or verbal communication, similar to a level of communication occurring between humans.

For example, the inventive method for translating text written or articulated in a source natural language, to a target natural language, in reliance upon a multidimensional sentence model, includes a number of acts or steps. These include separating the text written or articulated in the source natural language into sentences that convey a core sentence concept, parsing the sentences to assign codes and/or directional operators to each of the words in the sentences, according to a first set of model-defined rules and processing the assigned codes and directional operators according to a second set of model-defined rules to generate a translated sentence in the target language that conveys the core sentence concept.

Preferably, the step of parsing includes, for each word, searching lexical databases to accurately characterize the word consistently with the core sentence concept. Also, searching lexical databases includes implementing a search engine to search publicly available databases. The parsing preferably includes, finding each word in accessible vocabulary databases, to secure an understanding of the word's part of speech, and determining which words are branches. The first set of model-defined rules may determine that nouns are branches if the next word is also a noun (except the last word). Also, the first set of model-defined rules may determine that adjectives are branches if the next word is a noun, a pronoun, or another adjective (except the last word). And, the first set of model-defined rules assigns numbers to the words. The step of processing the assigned codes and directional operators according to the second set of model-defined rules generates a translated sentence in the target natural language.

The invention also includes a method for translating a work written or otherwise articulated in a source natural language text into a target natural language text, in reliance upon a multidimensional sentence model. The method includes separating the work written or otherwise articulated in the source natural language text into sentences, parsing each sentence in the source natural language text in accordance with the multidimensional sentence model, including assigning codes and/or directional operators to each word of the sentences, to realize a set of codes and direction operators that for each sentence, defines that sentence's core concept and processing the assigned codes and directional operators to create translated sentence in the target language, wherein each translated sentence accurately communicates the sentence's core concept in the target language.

The invention also includes a natural language translation system comprising a processor and an I/O device for inputting and/or outputting works natural language text. An application program, operational in the processor, that receives and processes a work written or otherwise communicated in a source natural language, to realize a number of sentences, then parses the sentences according to a multi-dimensional model by which codes and/or directional operators are assigned to each word of the sentence and then generates corresponding sentences in the source language according to the assigned codes and directional operators.

The translated sentences comprise the translation of the work in the target language, where one or more databases including data on the words used in the sentences in the source natural language, the target natural language or both. Preferably, the system includes a device for translating the spoken word into a textual work for translation from a source natural language of the textual work into a target natural language of the textual work. The device for translating processes a work translated into a target language and generates sounds that articulate the translated work into spoken words of the target language.

BRIEF DESCRIPTION OF THE DRAWINGS

Further features and advantages of the invention will become apparent from the description of embodiments that follows, with reference to the attached figures, in which.

DETAILED DESCRIPTION OF THE INVENTION

The following is a detailed description of exemplary embodiments of the invention, which are depicted in the accompanying drawings. The exemplary embodiments are presented in such detail as to clearly communicate the invention and are designed to teach how to make and use these exemplary embodiments to a person of ordinary skill in the art. However, the amount of detail offered is not intended to limit the contemplated variations of the embodiments of the disclosed invention. On the contrary, the inventor intends to cover all modifications, equivalents, and alternatives falling within the spirit and scope of the disclosed invention, as defined by the appended claims.

Sentences

A sentence is a set of words that represents a thought or an emotion of an entity. Usually, a sentence has to possess some degree of syntax for it to properly convey meaning. It can also be used by one entity for communicating with a different entity. Greetings, making requests or commands, and sharing information are examples of sentences being used between two people or more for communication purposes. Sentences such as "Hi," "Get down from there," and "What day is it?" are examples of sentences being used for communication. Sentences such as "I think therefore I am" and "Darn it" are examples of sentences being used by oneself for expressing thoughts and emotions. A sentence is comprised of one or more words. For a sentence to represent an independent thought, it requires a subject and a verb. Here is an example:
 (1) Birds fly.
 (2) They fly high in the sky.

Sentence (1) is an independent thought. It does not depend on any other sentence to convey meaning. However, sentence (2) is a dependent thought because of the pronoun they. Without sentence (1), the subject of sentence (2) cannot be determined. For a dependent thought like sentence (2), the subject can be omitted, at least in some languages like Korean. In theory, a sentence can have an infinite number of words and is not bound by a limit of words it can have. Also, all natural languages are known to be capable of having recursion. This means an infinite number of sentences can be produced even with only a few words such as Tom, Sally, and, and jumped.
 Tom jumped.
 Tom jumped and Sally jumped.
 Tom jumped and Sally jumped and Tom jumped.
 Tom jumped and Sally jumped and Tom jumped and Sally jumped.

When sentence structures are simple enough, parsing sentences is fairly straightforward. For instance, the following two sentences have the same sentence structure type:
 Sarah loves baseball.
 <Sarah>---<loves>---<baseball>
 The family went fishing.
 (The)-<family>---<went>---<fishing>
 ( )=branch, < > =node Both sentences begin with a noun phrase (NP), followed by a verb phrase (VP), and end with another noun phrase (NP.)
 NP→VP→NP
 NP→VP→NP But if sentences are more complex, parsing them can become much more difficult and errors in sentence analysis or translation may occur.
 Sarah from Wisconsin really loves baseball.
 <Sarah>-(from)-(Wisconsin)---(really)-<loves>---<baseball>
 The entire family of Jake went fishing.
 (The)-(entire)-<family>-(of)-(Jake)---<went>---<fishing>

The problem of representing a thought as a written sentence is that the sentence becomes more and more complicated for analysis as the number of words increase. This is because all the words are written in the same direction or dimension. With the synapper processing and modeling, according to the inventive principles, the syntax structure of a sentence becomes a lot more intuitive by using two or more directions or dimensions (when they're demonstrated in 2D or higher). As used herein, "synapper modeling" is a model-based method used to transform traditionally written sentences (1D or linear) into multi-dimensional sentence structures, which may then be relied upon to effective transform the sentence from the source language to the target language. That is, the synapper model relies on processing to realize a multi-dimensional representation of a sentence. The synapper model processes and a presents a sentence in a way that sentences (thoughts) are structured by the human brain, i.e., based on how the human brain forms sentences. Once the sentence (i.e., the idea or concept behind the sentence) is processed and presented in the synapper form or model, it is readily re-created or rendered into a sentence of practically any target language for translation.

For example, the sentence "Sarah loves baseball" and the sentence "Sarah from Wisconsin really loves baseball" may be said to have the same underlining structure, idea, theme or concept. For that matter, the two sentences also have the same kernel sentence; NP→VP→NP. The same goes for "The family went fishing" and "The entire family of Jake went fishing." All of these four sentences belong to the same kernel. Interestingly, these English sentences possess the right word order of other languages without having to translate. In some cases, by simply switching the direction of flow, the sentence from one language turns into another. For instance, to have the same sentences in Korean, each sentence should be read counterclockwise starting with the subject.

Types of Sentences

Many types of sentences are known. Here are types of English sentences with examples:

Statements: The dog is sitting on the porch.
Commands: Give me the scores of today's NBA games.
Questions: How long is a yard in meters?
Answers: Yes.
Exclamations: Oh my God.
Interactions: See you later.
Representations: Kaboom.
Mathematics: 5×3=15.
Codes: GX6H8E.

The first six types are main types of sentences and are necessary for every language, not just English. The last three sentences (i.e., representations, mathematics, codes) are "optional" or not necessarily common in every language. Representations is a type for representing particular sounds or motions. Mathematics could also be considered as a type so they can be processed accordingly. Codes is operational codes for internal use or special functions. According to one simple embodiment of inventive synapper model, and method of translation implemented in reliance upon the synapper model embodiment, any other type of sentence is treated as unrecognizable and an error message will be produced.

The application program parses each sentence, and based on the inventive synapper model, determines the sentence type of an input, and, thereby, determines what the output's type is supposed to be. For instance, in natural language generation, if an input is a question, then the output should be an answer type.

In general, the following rules can be applied for determining the type of a sentence for the English language:

Statements: The subject is placed before a verb and the question mark is absent.

Commands: The expression begins with a verb and the question mark is absent. Typically, there is an exclamation mark after a command.

Questions #1: The expression begins with a verb or a WH word such as where.

Questions #2: The expression ends with a question mark.

Answers #1: The expression begins with "Yes," "No," "Maybe," "I don't know," etc.

Answers #2: The expression is a statement and is followed by a question.

Exclamations: The expression matches an exclamation sentence in the database.

Interactions: The expression matches an interaction sentence in the database.

Representations: The expression matches a representation sentence in the database.

Mathematics: The expression contains numbers and mathematical symbols without words.

Codes: The expression matches a code word in the database.

The Default Structure

Most written sentences belong to the sentence type: statements. Also known as declarative sentences, they represent independent and dependent thoughts as well as one's emotional states and opinions. Each language has a unique sentence structure for expressing statements. In English, it is the following:

(C)+(F)+S+VP+_?_+(T/M)

This essentially how the English language works. That is, the above is just an example of how a program can use synapper modeling to match sentences with a certain sentence type. For instance, if a user asks "How big is the Moon?" then the answer should look like "The Moon is (x)" or "The size of the Moon is (x)." So the program should search a database like Wikipedia and look for the same sentence type where the subject is the Moon.

The predicate of a sentence is composed of the subject and the verb phrase. But some sentences begin with a conjunction (e.g. but), a fragment (e.g. be that as it may) or both. They can also end with phrases dealing with time or date, which is also optional. What comes after the subject and the verb phrase is what makes each sentence unique, particularly in the context of the synapper. The following are several types of verb phrases (VP) in English.

Verbs (1) Be/be+not/be+adv+not/adv+be/adv+be+not
(2) Reg/do+not+reg/adv+reg/adv+do+not+reg/do+not+adv+reg
(3) Aux/aux+be/aux+not+be/aux+adv+be/adv+aux+be/adv+aux+not+be
(4) Aux+reg/aux+not+reg/adv+aux+reg/adv+aux+not+reg
(5) Have/have+be/have+not+be
(6) HON+to+be/Do+not+HON+to+be/Adv+HON+to+be/Adv+do+not+HON+to+be/Do+not+adv+HON+to+be
(7) HON+to+reg/Do+not+HON+to+reg/Adv+HON+to+reg/Adv+do+not+HON+to+reg/Do+not+adv+HON+to+reg Reg stands for regular verbs. Aux stands for regular auxiliary verbs. Adv stands for adverbs. HON stands for have, ought, and need as auxiliary verbs. The difference between HON and other auxiliary verbs is that HON is followed by to+reg.

All the types above can be grouped into five categories:

(Adv)+be+(adv)+(not)
(Adv)+(do)+(not)+(adv)+reg
(Adv)+aux+(adv)+(not)+(be/reg)
(Adv)+have+(not)+(be)
(Adv)+(do)+(not)+(adv)+HON+to+be/reg Each verb phrase can have up to one adverb placement.

Parsing

Once a sentence is parsed completely, according to the inventive application program, in reliance upon the synapper model. Once the sentence is transformed to the model, it can then be utilized for specific needs. For instance, the following sentence can be analyzed according to the synapper model, step by step, for generating output:

I need more milk.

First, the sentence is given a structure of the synapper. That is, the application program processes the text to figure out each word's part of speech by looking them up in the lexical databases (verb database, adjective database, source of data available through ISPs, etc.), that are relied upon by the inventive method. Next, the application program determines whether each word in the sentence being processed is a branch or a node by analyzing the parts of speech of the words that come before and/or after. Then, the inventive application program attaches all the nodes in one direction and attaches the branch words to their nodes in different direction(s).

Sentence after synapper model processing:

<I>---<need>---(more)-<milk>

Then, the type of the sentence is determined based on the synapper model. That is, once the sentence is processed by the application program to realize the synapper style, all the branch words can be removed. What is left of the sentence (which is just the nodes) is considered a core sentence (e.g. <I>---<need>---<milk>), based on the synapper modeling. This can then be further processed according to the inventive principles to further strip down the original sentence in the source language to the nodes' parts of speech (e.g. <Pronoun>---<Verb>---<Noun>). The application program then uses this information to figure out whether the sentence is a question, a statement, or something else (i.e., some other type of sentence structure). The sentence based on the synapper model processing can be considered either as a statement or a command. Then, the instant sentence model can further be analyzed for its content such as identifying the subject, the verb phrase, and the rest of the sentence.

To put it simply, the first verb group of words in a sentence reading from left-to-right is the verb phrase. The application program knows which words are verbs by finding matches with the verb database, as explained above. The noun phrase that come before the verb phrase is the subject (which applies in the English language, where other)" non-English) languages have different rules. The output or the response of this sentence will depend on the objective, which could vary. The inventive process is used ideally for translating one language into any other language or some other purposes such as verbal data analysis or communicating with customers. For instance, the translation of this sentence into another language could be the output. If this sentence is considered by a program where the rules and the parameters will be unique as a type of a command, then an action of some sort will be required. If the sentence is part of a text message, a simple response will be generated and it will be stored in memory for later conversation.

Words

Words are used to trigger or otherwise access certain neural activities in the brain. For instance, the word dinosaur can regenerate imagery of a giant reptile roaring in the wild all from one's own memory. Without words, it is far more difficult to bring back neural connections dedicated to a certain object or event stored in the brain. Words are the building blocks of sentences and therefore thoughts. Language makes use of words and affixes to convey meaning. It may seem words are inherently sound-based, but this is not true. Deaf people, for example, use hand signs as words without involving sound in any way. Even text can be considered words although this is somewhat different from sounds and signs. For people whose native language is an oral language such as Portuguese and Malay, written forms of words are associated with words in the first level and not the concepts themselves. For instance, the sound of the word dinosaur ("die-no-sore") is a first-level word representing the big animal. In contrast, the written word d-i-n-o-s-a-u-r represents the sound of the word and not the animal itself. Thus, words in form of text should be considered second-level words which are based on first-level words.

First-level word:
dinosaur (concept) →"die-no-sore" (sound)
Second-level word:
"die-no-sore" (sound) →d-i-n-o-s-a-u-r (text)

With synapper modeling, this knowledge is available (stored in) databases and therefore, available for use. Instead of using text as representations of sound, it can function as words in the first level that represent concepts. For example, by using six-digit numbers as first-level words, text no longer has to represent specific sounds. (Six digits are given so there can be 1,000,000 different words, which should be sufficient. By using letters in addition to using digits, this number can become even higher if necessary.) Words in the first level represent specific concepts (e.g. peace, sky, lamp, etc.) which are universal. By using numbers as words, these "words" do not have to belong to one particular language. So the database containing first-level words will be the same for all languages. Words in the second level need different databases since they belong in specific languages. This method also eliminates the dependency of belonging to a particular language like English. An extra digit can be attached in the beginning and at the end for prefixes and suffixes. Here is an example:

0100019610

This first-level word represents the concept house. Since it is without any affixes, the first and last digits are zero. Here is another word:

0100052813

This word, 00005283 means jump. But the suffix digit indicates it should be written in the past tense, jumped. These first-level words can be used with synapper modeling, giving visual representations of thoughts. Number words are language-independent first-level words for the machine that behave just like regular words in a particular language. The only difference is that they represent concepts directly without having another form of representation where sounds or hand signs are involved. (Sounds/signs represent concepts where written text represents sounds/signs that represent concepts.) This is supposed to mimic how the human brain handles language data. These number words are used in the synapper the exact same way:

First Synapper Model (All)-<work>---<and>---(no)-<play>---<make>---<Jack>---(a)-(dull)-<boy>

Second Synapper Model (00004290)-<00007920>---<00000280>---(00000730)-<00005840>---<00008690>---<00520480>---(00000110)-(00030820)-<00000410>

The first synapper model is in a particular language and each word represents a certain sound. The number words do not represent any sound at all. They only represent concepts like dogs, time, and shoes. Since they represent concepts, such as a visual image of a rainbow, they can turn into actual words like the word "rainbow" or "mujigae" which is "rainbow" in Korean. By replacing words in a particular language into these first-level "machine words," the inventive application program presents the purest or the most authentic forms of sentences/thoughts with the help of the synapper. (With a conscious added to the machine, it can now think and talk like humans, at least in theory.)

The second model, however, does not belong to any language in particular and the words represent thoughts themselves. Using a database, the application program links a word like "automobile" with a number word, say 04835570. So, a typical sentence is processed by the inventive program into a sentence with number words. (e.g. "03478920 23492421 49754790 79347233 74923490.") Once this sentence is in a synapper structure, it can be parsed for different purposes such as natural language generation, translation, etc. From this second model, a thought can be expressed in any natural language by replacing each word with the equivalent word in a particular language. This method is one step closer to simulating the process of generating thoughts in the human brain. Another advantage of this method is words can be translated into second-level words of a language without errors. Here is an example:

<Did>---<you>---<say>---<orange>
<00000332>---<00000050>---<00000660>---<00005180>

The word orange in the English sentence can either mean the color or the fruit. But with first-level words, there is no ambiguity since orange as a color and as a fruit is given two different words as they represent two different concepts. So the translation of 00005180 into Spanish will be either anaranjado or naranja, the former being the color and the latter being the fruit. But it cannot be both since the word can only mean one thing.

The synapper only represents the structure of a sentence. The application program, based on the synapper model, does not affect words in the sentence at all but ostensibly only shapes the entire sentence as a whole. Figuring out the shape or the structure of a sentence is done by the application program through analysis of each word's part of speech and its relation to the previous or next word's part of speech, including looking them up in the lexical databases, as explained above.

Once the synapper structure (i.e., the synapper model structure) is determined, then the branch words are removed by the application program to obtain the "core sentence." This optional step makes parsing sentences easier for the program to yield more accurate results. As an additional step, the application program replaces each word with a number word. This realizes a language-independent sentence that can be translated into any natural language by (1) replacing each number word with an actual word and (2) processing the sentence either clockwise or counterclockwise depending on which word order the language belongs to. (e.g. SOV, SVO, VOS, OSV), in accordance with the inventive principles. Summarizing, the inventive method, application program and system that implements the method process natural language text in accordance with multidimensional models, and then renders the core sentence into a target language sentence, conveying accurately the thought intended to be conveyed in the source language.

Figure 1:
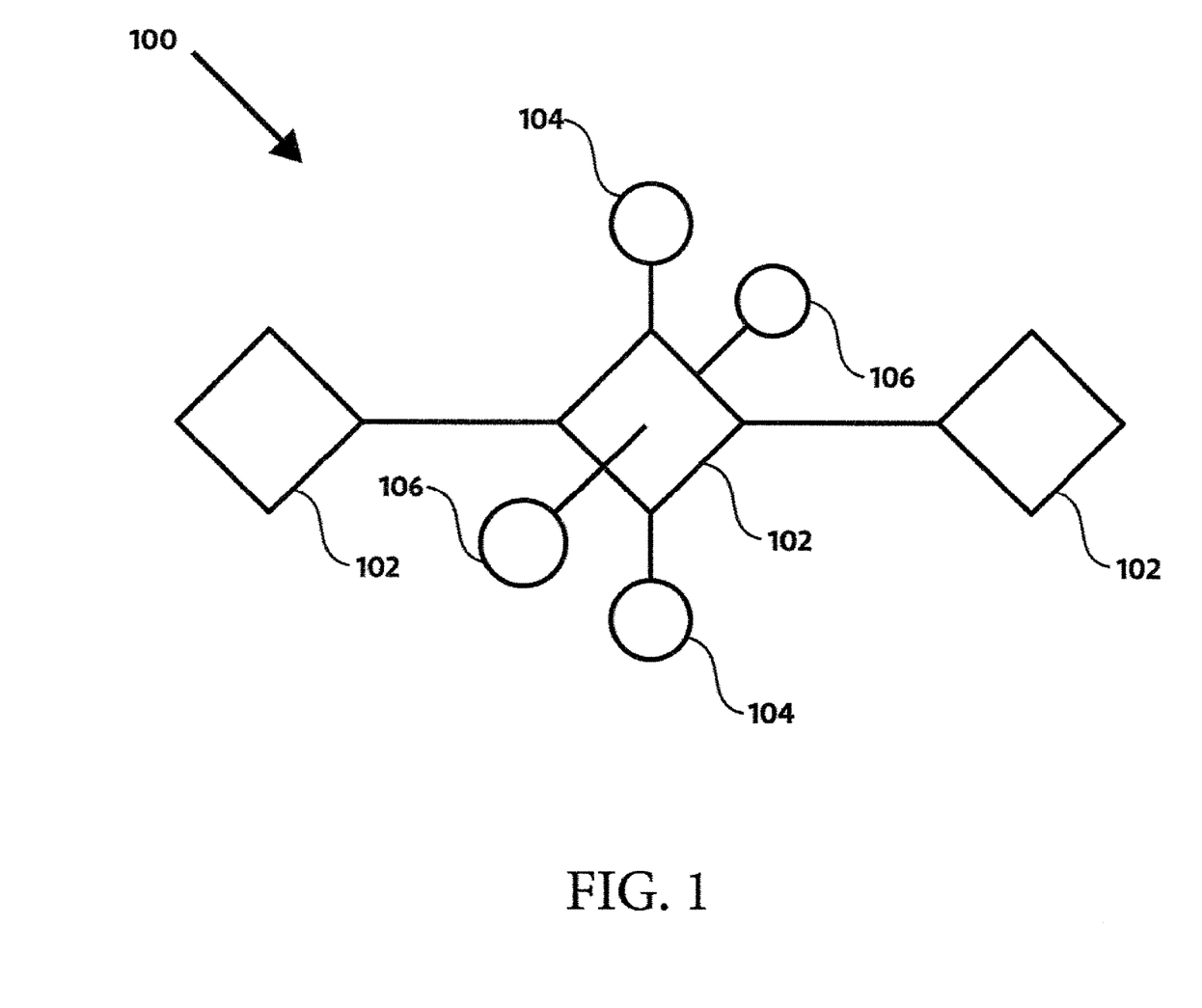
FIG. 1 presents a three-dimensional ("synapper") model for words in a sentence, in accordance with the inventive principles.

FIG. 1 presents one embodiment of a three-dimensional ("3D") synapper model 100 for words in a sentence, in accordance with the inventive principles. As can be seen, the 3D synapper model 100 represents words in a sentence connected in three directions, including nodes 102. Nodes 102 define a main connection of words in a closed circuit. The connection of nodes (node↔node and not branch↔node) is the main connection of words and each synapper model should be a closed loop with the nodes. Branch-node connections, on the other hand, are not closed circuits. The exemplary 3D synapper model includes branches 104, 106, extending from a second node 102, linked to the first node as shown. All nodes (according to the synapper model) share one main connection or flow of direction. Each node can have zero or more branches in other directions. Without branches, nodes by themselves would not be multi-dimensional.

As should be clear to the skilled person, words are defined as either nodes or branches, according to the synapper model and inventive application program, based on their parts of speech and the previous/next words' parts of speech in the model. All the nodes would be in one direction. Branches can either have one opposing direction (2D) or multiple different directions (3D or higher) depending on the program. All branches, by definition, must be in a different direction from nodes. Nodes are in one direction in a closed circuit. Branches are words that connect to particular nodes from different directions. In a preferred processing embodiment, the inventive method treats all branches the same and puts or defines the branches in one direction (2D). But the invention is not limited to such processing. That is, the invention is enabled to use more than one direction for branches, depending on what the branches are (3D or higher).

For example, numerical or quantifier branches (e.g. five, million) can belong in one direction/dimension and qualifier branches (e.g. big, soft) can belong in another direction/dimension. Branches do not necessarily have to be limited in one dimension whereas all nodes are in one dimension. Part of the inventive operation is premised upon an understanding that the human brain likely uses multiple dimensions for branch words. For example, each node or branch represents a word such as "baby" or "proliferate." Words are labeled by the application program according to the synapper model either as nodes or branches based on their relationships with other words in the sentence. For instance, if an adjective is followed by another adjective or a noun, then it becomes a branch (e.g. fast car). If an adjective is not followed by another adjective or a noun then it becomes a node (e.g. The car is fast).

Figure 2:
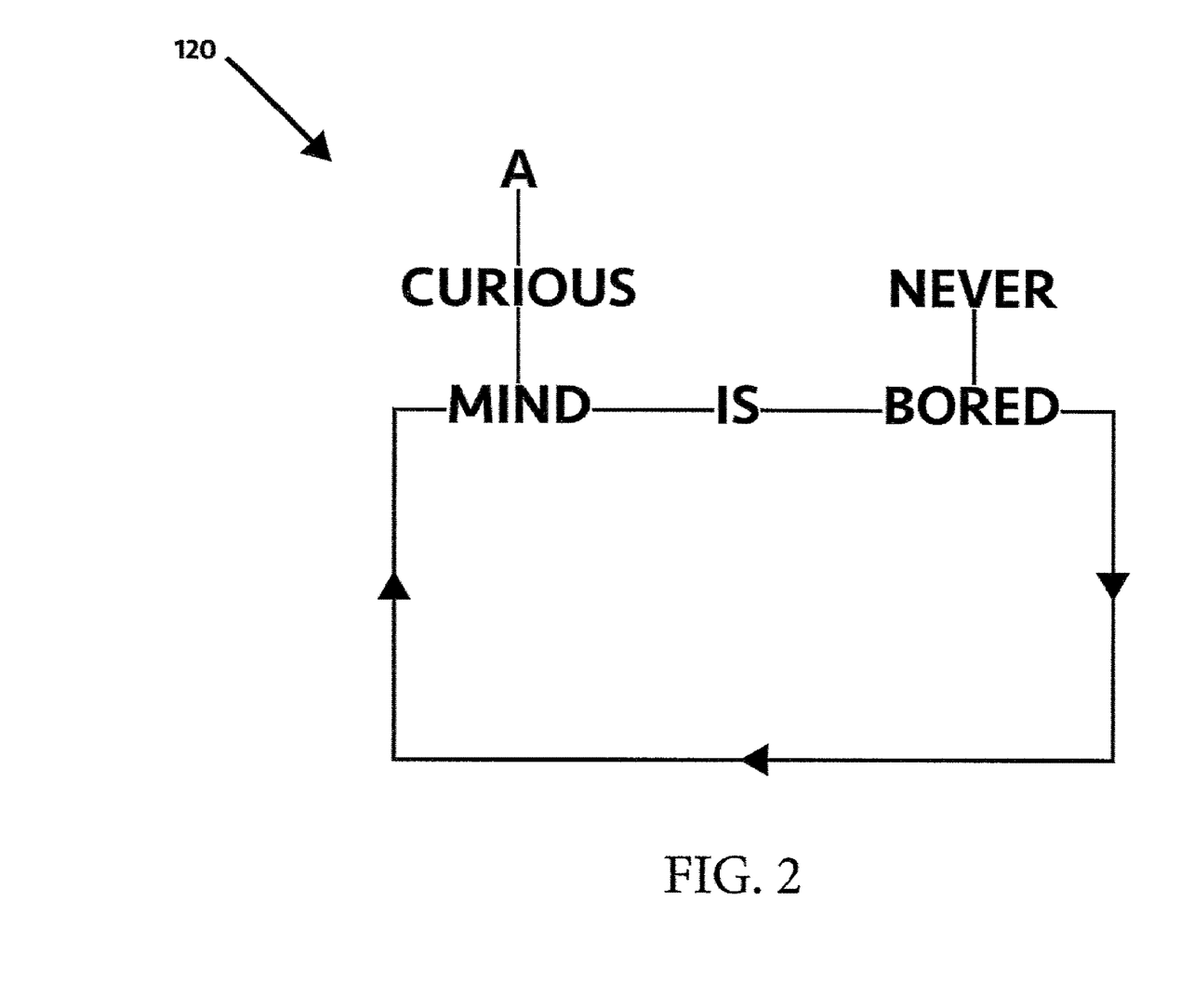
FIG. 2 presents a two-dimensional sentence processing scheme for right-word-order languages, in accordance with the inventive principles.

FIG. 2 presents a two-dimensional ("2D") sentence processing scheme 120 for right-word-order languages, in accordance with the inventive principles. The words of a sentence are processed in a clockwise manner to generate the right-word-order of the sentence for English and other languages. Please note, however, that since synapper modeling is not limited to just two directions (one for nodes, one for branches), a 3D model could be included, showing one direction for qualitative branches (e.g. beautiful) and another direction for quantitative branches (e.g. five) as an example of utilizing more than two dimensions total. Still, the most practical use of synapper modeling would be in 2D.

Figure 3:
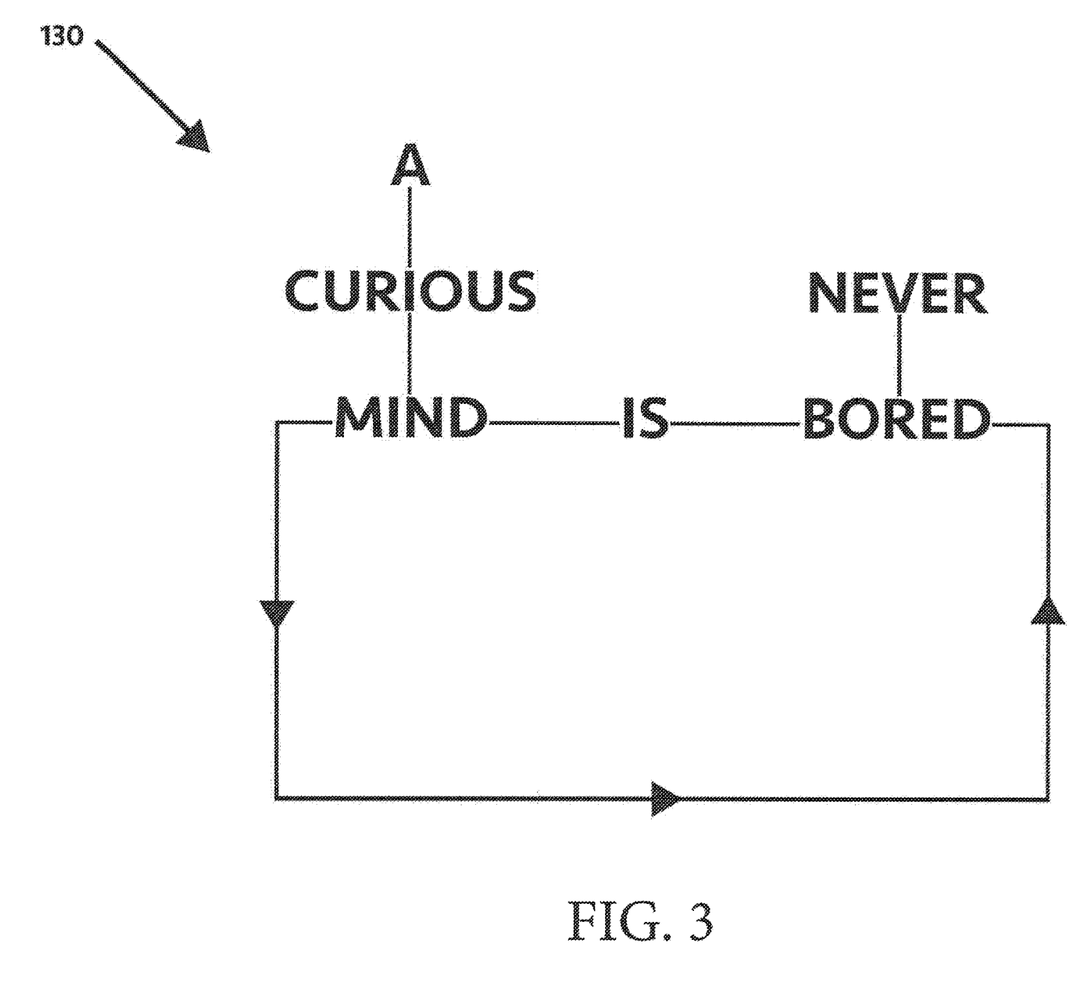
FIG. 3 presents a two-dimensional sentence processing scheme for left-word-order languages, in accordance with the inventive principles.

FIG. 3 presents a two-dimensional (2D) sentence processing scheme 130 for left-word-order languages, in accordance with the inventive principles. The 2D sentence processing scheme for left-word-order languages relies upon the same sentence as in FIG. 2. However, in FIG. 3 the sentence is shown being processed in a counterclockwise manner to generate the left-word-order of the sentence for some languages, such as Korean. By replacing each word with the equivalent word in a left-word-order language, such as Korean, the original sentence in English turns into a Korean sentence.

Figure 4:
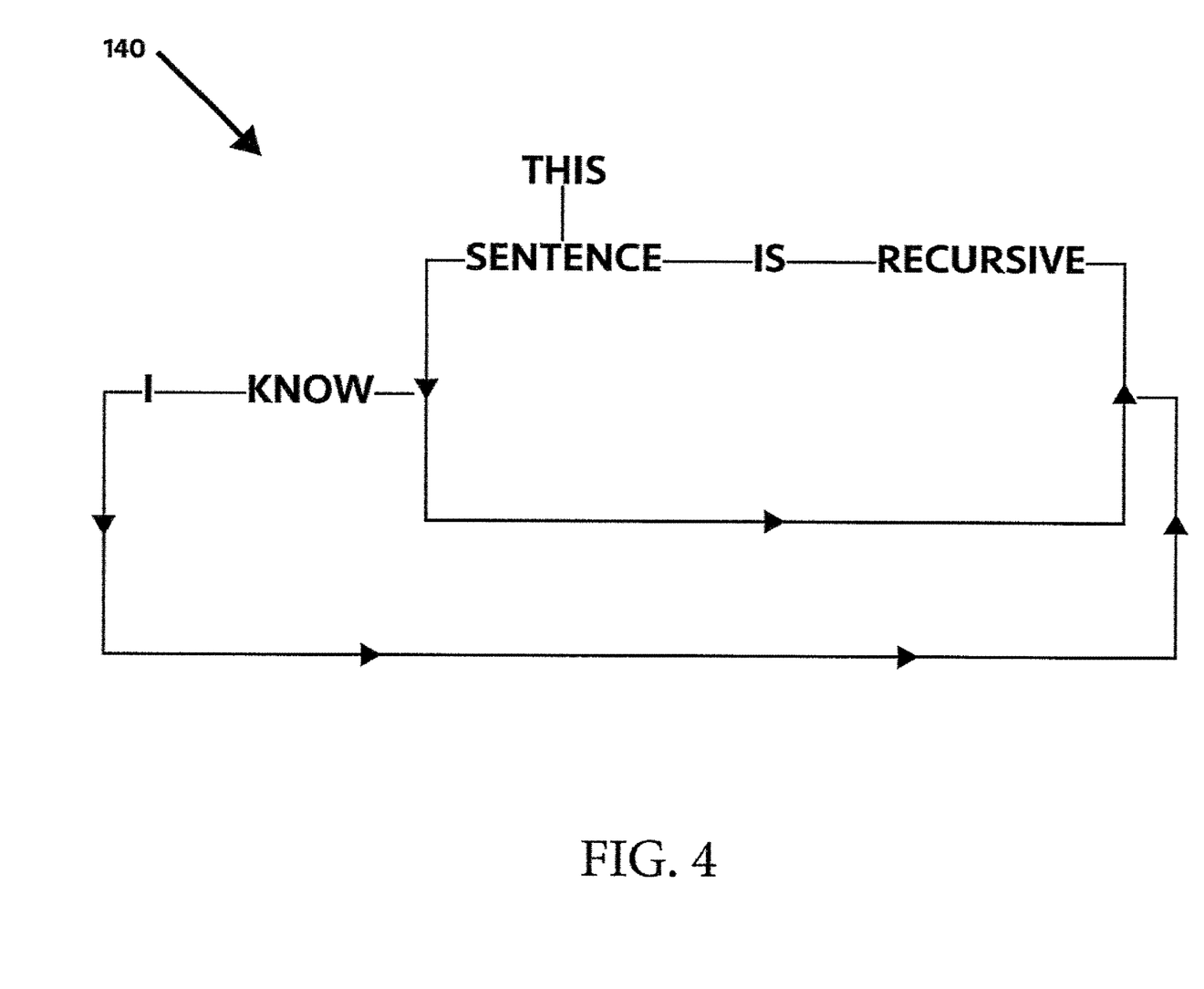
FIG. 4 presents a two-dimensional sentence processing scheme for processing sentences having recursion or that are recursive, in accordance with the inventive principles.

FIG. 4 presents a two-dimensional sentence processing scheme 140 for processing sentences having recursion, or that are recursive, as shown, in accordance with the inventive principles. The scheme is used in accordance with the multidimensional model to process sentences embedded inside other sentences. This English sentence flowing in a counterclockwise manner (right-word-order) yields the correct word order for the sentence to be in some languages such as Korean (left-word-order), making natural language translation possible in one simple step.

The inventive method of parsing, and/or translating, natural language text, in reliance upon the multidimensional model and inventive principles embodies a set of computer readable instructions, in the form of an application program. The application program may be downloaded to a computer system or device, or transferred to a computer system or device from a computer readable medium, such a portable memory device with a USB port. A processor then processes the instructions to implement the method, including inputting the natural language text into a processing pipeline. The input natural language text is then parsed for readability, or for translation, by the processor/application program.

Figure 5:
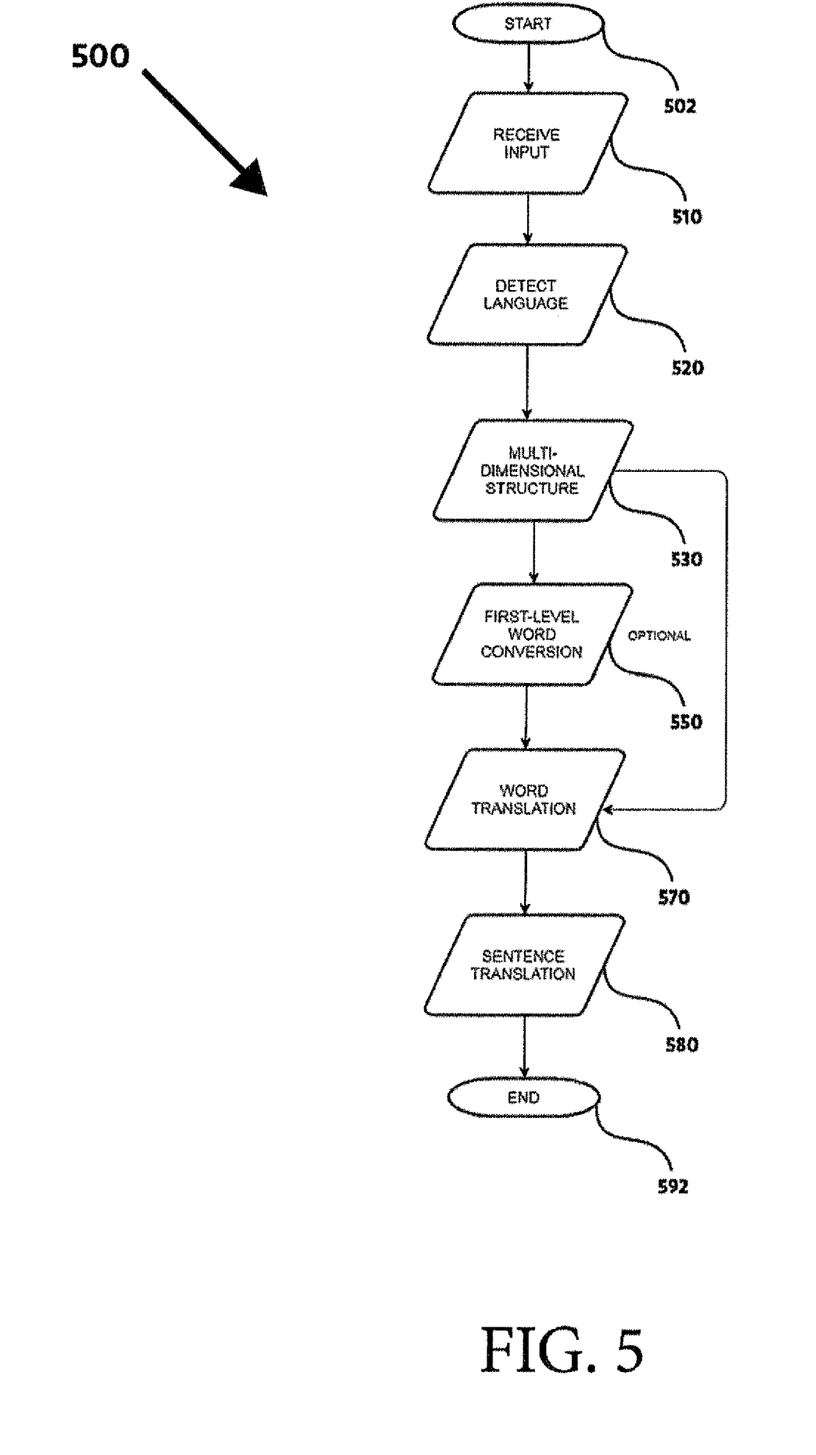
FIG. 5 is a program flow diagram depicting a method of processing a first natural language text to realize a translation to a second natural language text.

FIG. 5 presents a program flow diagram 500 depicting one embodiment of a method of processing a first natural language text to realize a translation to a second natural language text, in accordance with the multidimensional synapper model and inventive principles. Element identifier 502 represents a step of initiating the application program within a computer system to which the application program has been downloaded for intended operation. This step could include implementing steps required to configure the application program. Element identifier 510 represents a step of receiving a first natural language text ("Receive Input"), for parsing and/or translation. The step of receiving 510 will generally include either downloading the first natural language text and loading the text into the pipeline for processing, or if the text is already stored in the computer system, linking it to the processing pipeline.

Element identifier 530 represents a step of first processing the first natural language text according to the inventive multidimensional model ("multidimensional structure"). The multidimensional structure step separates the text into sentences. As is known, sentences represent and communicate thoughts. The same sentence can be written in many different languages, but the thought behind or underlying the sentence is still the same. Saying "the bird is on the tree" in English, French, and Spanish all mean the same thing. So there is some kind of a formation of thought happening in the human brain. The synapper model represents or mimics that formation. Once a sentence is in a synapper structure, it is in the right format where it can be translated into any other language by processing the sentence clockwise or counterclockwise starting with either S, O, or V (subject, object, or verb word).

For that matter, there are only six (6) choices of word order for every language; SOV, SVO, OSV, OVS, VSO, and VOS. Three of them travel in one direction (say clockwise) and the other three travel in the opposite direction (counterclockwise). So, if we have the right structure, the sentence can be translated into any natural language, at least in theory. The synapper gives sentences the right structure. The inventive application program processes sentences in synapper modeling language independent of language by using numbers as words. This is distinguishable from the common practice of translating each word in a particular language (e.g., a source language) into words in another language (i.e., the target language), because many words have multiple meanings and mistranslation can occur.)

Element identifier 550 represents a step in which a first-level word conversion is performed on the sentences in view of the detected natural language. The first level word conversion step is optional. Element identifier 570 represents a step of word translation, in the case where the method is slated to translate the first natural language text into a second natural language. Element identifier 50 represents a step of sentence translation, in which the processed words of the sentences of the first natural language text are further processed in reliance upon the sentence processing schemes, to realize a translation to a sequence of sentences comprising the text translated to a second natural language.

In order to implement the invention, vocabulary databases (such as lexical databases, including verb database, adjective database, etc.), must be configured first (e.g. verb words are put into a group, adjective words are put into another group, etc.) and rendered accessible to the operational application program.

The inventive application program then takes each word of the input sentence and finds the words in the vocabulary databases, to secure an understanding of each word's part of speech. Then, the inventive program processes to determine which words are branches, according to a rules engine or function. The rules engine processes and defines:

(1) determiners are branches except the last word of the sentence;
(2) nouns are branches if the next word is also a noun (except the last word);
(3) adjectives are branches if the next word is a noun, a pronoun, or another adjective (except the last word);
(4) Adverbs are branches if the next word is an adjective or another adverb (except the last word); and
(5) the remaining words are nodes.

Nodes are covered in <brackets> and branches are covered in (parentheses). Branches are connected to their parent nodes with one dash each. Everything else is connected with three dashes, ---. The (branch)-<node> relationship is supposed to represent a multi-dimensional structure like below:

All the nodes are horizontal whereas the two branch words are connected to their parent node ("house") vertically.

The following is a portion of an application program that implements some of the inventive processing according to the synapper model:

User System Access

Figure 6:
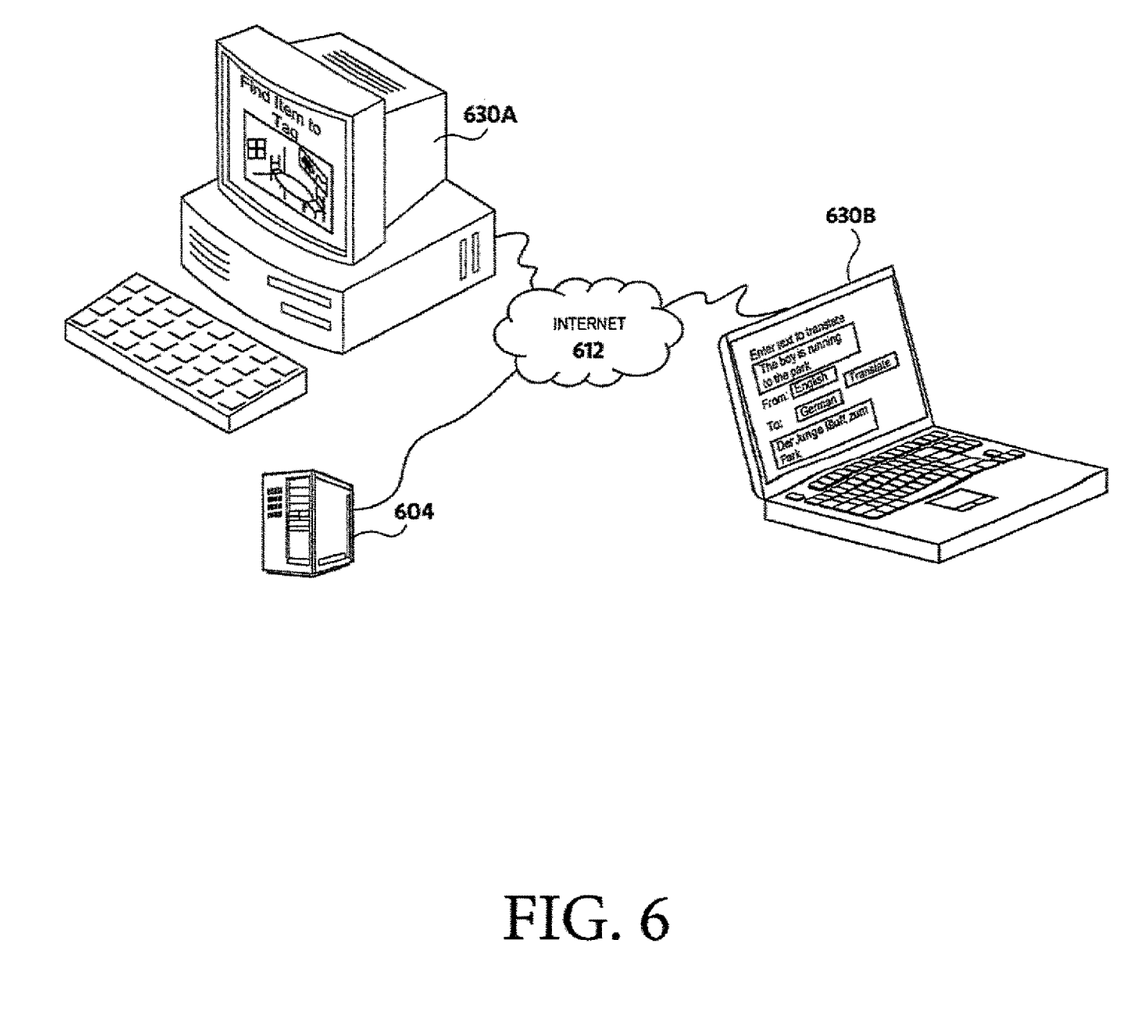
FIG. 6 is a multi-dimensional natural language parsing system, configured according to the invention.

Turning to FIG. 6, an embodiment of a multi-dimensional natural language parsing system and means for accessing it are illustrated. Although such a multi-dimensional natural language parsing system can take many forms, a web-based translation system can provide easy access for a large number of interested users. For example, a computing system 604, such as a server, may store some or all of the programming code that when executed produces some or all of the functionality of the inventive multi-dimensional natural language parsing system, including the application program (FIG. 5).

The server 604 may electronically communicate with a public or private, local or wide area network 612, such as, for example, the Internet. In turn, various users can electronically communicate with to the multi-dimensional natural language parsing using other network-enabled devices. Suitable user devices include personal computers, laptop computers, data network enabled phones or other mobile devices (such as, for example, Blackberry® devices, Apple iPhone® devices, other PDAs, mobile phones, and the like). Users may access the multi-dimensional natural language parsing system through a web interface through a browser or through a stand-alone program installed on the user device, in some embodiments.

One user may use a personal computer 630B to access a translation service, input text for translation, select source and destination languages, and receive the appropriate translated text as described with reference to FIGS. 1-5. Meanwhile, another user may utilize the multi-dimensional natural language parsing system through a different interface on their computer 630A. The multi-dimensional natural language parsing system is preferably scalable to allow a number of users to access the system at any given time. With this approach, multiple users may attempt to use the multi-dimensional natural language parsing system simultaneously. In a preferred embodiment, the multi-dimensional natural language parsing system may provide a lockout mechanism to allow only one user to edit a specific natural language text, for example, at any given time.

Other Applications

Although much of this disclosure focuses on the use of the multi-dimensional natural language parsing system for translating text, there are other uses for multi-dimensional natural language parsing system. An embodiment of the multi-dimensional natural language parsing system as described herein can parse a natural language search query, such as a sentence or a question.

As an example, a user types a question into the webpage of a search engine: "What recent court decisions define qualifying income tax?" This question is parsed regarding its syntax and morphology, and the components of the text and their relations are extracted according to the inventive principles.

Another aspect of this disclosure can be used to plainly analyze a natural language text. It is possible to use the multi-dimensional natural language parsing system to retrieve the topics presented in a text. This can be used to categorize a text automatically. Further it can be used to find logical chains or information about semantic structures in the text. Similarly, topic extraction can help expand search queries in a correct environment.

Computer Hardware

Figure 7:
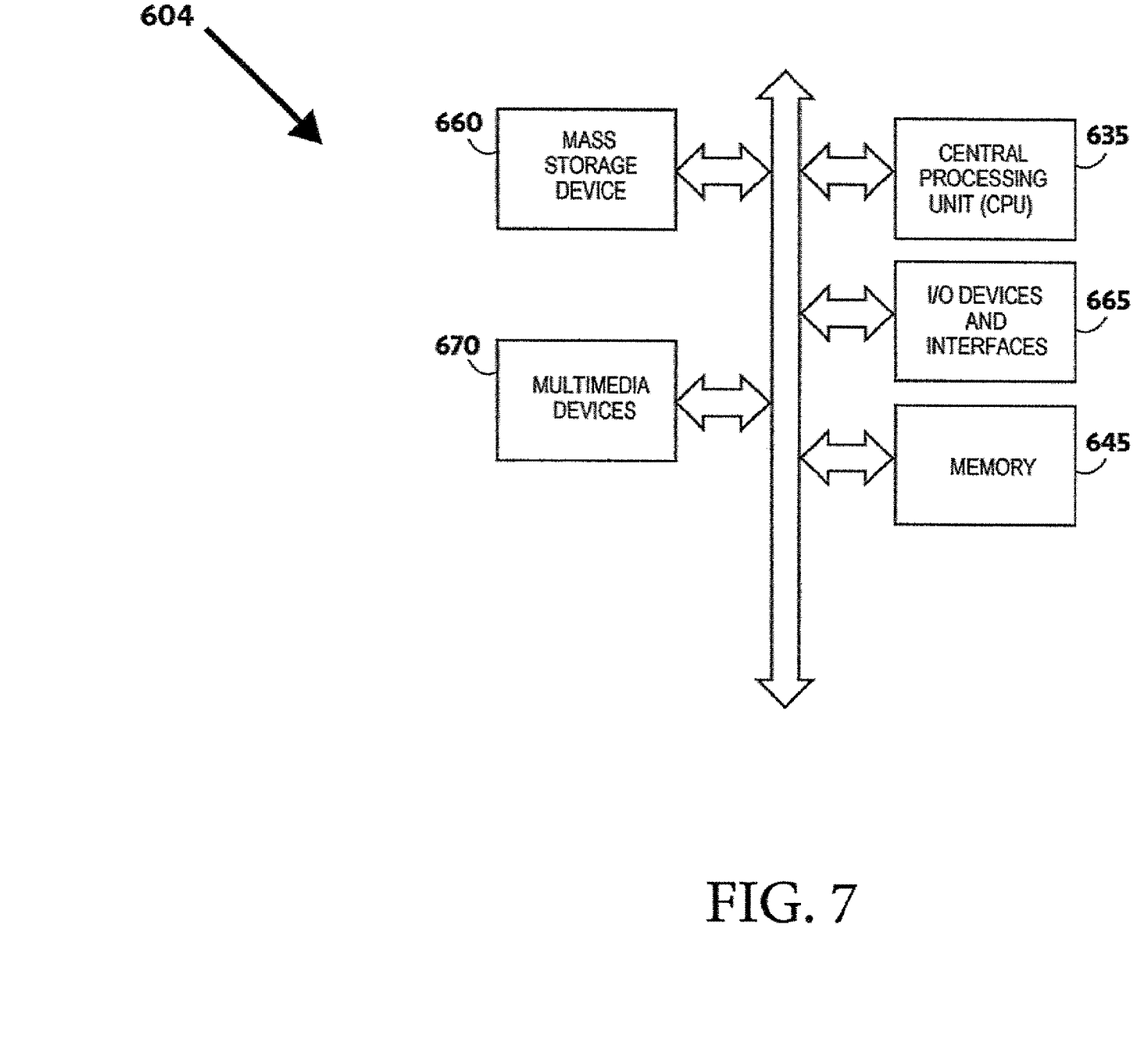
FIG. 7 is a system level diagram of one embodiment of a computing system that may be used to implement the inventive systems and processes described herein.

FIG. 7 illustrates a block diagram of one embodiment of a computing system 604 that may be used to implement certain inventive systems and processes described herein. For example, in one embodiment, the computing system 604 may be configured to receive translation requests from another computer system (such as a user PC 630A, 630B), use multi-dimensional natural language parsing system to translate the request into the proper natural language, and return the translation. The functionality provided for in the components and modules of computing system 604 may be combined into fewer components and modules or further separated into additional components and modules.

The computing system 604 includes, for example, a server or personal computer that is IBM, Macintosh, IOS, Android, Chrome OS, Linux/Unix compatible, or the like. In one embodiment, the computing device comprises a server, a laptop computer, a cell phone, a personal digital assistant, a kiosk, or an audio player, for example. In one embodiment, the exemplary computing system 604 includes a central processing unit ("CPU") 635, which may include a conventional microprocessor. The computing system 604 further includes a memory 645, such as random access memory ("RAM") for temporary storage of information and a read only memory ("ROM") for permanent storage of information, and a mass storage device 660, such as a hard drive, diskette, or optical media storage device. Typically, the modules of the computing system 604 are connected to the computer using a standards based bus system. In different embodiments, the standards based bus system could be Peripheral Component Interconnect (PCI), Microchannel, SCSI, Industrial Standard Architecture (ISA) and Extended ISA (EISA) architectures, for example.

The computing system 604 is generally controlled and coordinated by operating system software, such as Windows 95, Windows 98, Windows NT, Windows 2000, Windows XP, Windows Vista, Linux, SunOS, Solaris, or other compatible operating systems. In Macintosh systems, the operating system may be any available operating system, such as MAC OS X. In other embodiments, the computing system 604 may be controlled by a proprietary operating system. Conventional operating systems control and schedule computer processes for execution, perform memory management, provide file system, networking, and I/O services, and provide a user interface, such as a graphical user interface ("GUI"), among other things.

The exemplary computing system 604 includes one or more commonly available input/output (I/O) devices and interfaces 665, such as a keyboard, mouse, touchpad, modem, Ethernet card, microphone, and/or printer. In one embodiment, the I/O devices and interfaces 665 include one or more display devices, such as a monitor, that allows the visual presentation of data to a user. More particularly, a display device provides for the presentation of GUIs, application software data, and multimedia presentations, for example. The computing system 604 may also include one or more multimedia devices 670, such as speakers, video cards, graphics accelerators, and microphones, for example.

In an embodiment, a user enters text to be translated or processed through a keyboard or touchpad representation of a keyboard (input devices 665). In another, a microphone (another input device 665 accepts spoken text. The spoken text may be stored in any of a number of audio formats, such as for example, WAV, MP3, or other formats. The CPU 635 may process this audio text and convert it to written text, such as a string data object, a plain text data file, a Microsoft® Word document, or the like.

The I/O devices and interfaces 665 provide a communication interface to various external devices. In an embodiment, the computing system 604 is coupled to a network 612, such as a LAN, WAN, or the Internet, for example, (see FIG. 6) via a wired, wireless, or combination of wired and wireless, communication link. The network 612 communicates with various computing devices and/or other electronic devices via wired or wireless communication links. In the exemplary embodiment of FIG. 6, the network 612 is coupled to one or more user terminals or computing devices 630A, 630B. Computing device 630B can communicate the text input, in audio or written text formats, to computing system 604 for processing. In addition to the devices that are illustrated in FIG. 6, the network 612 may communicate with other data sources or other computing devices, such as lexical databases (verb database, adjective database, etc.). In addition, the data sources may include one or more internal and/or external data sources. In some embodiments, one or more of the databases or data sources may be implemented using a relational database, such as Sybase, Oracle, CodeBase and Microsoft® SQL Server as well as other types of databases such as, for example, a flat file database, an entity-relationship database, and object-oriented database, and/or a record-based database.

In the embodiment of FIG. 7, the computing system 604 also includes an application module that may be executed by the CPU 635. The multi-dimensional natural language parsing system embodies a module or application program that manages the parsing and/or translation of the natural language text. This module may include, by way of example, components, such as software components, object-oriented software components, class components and task components, processes, functions, attributes, procedures, subroutines segments of program code, drivers, firmware, microcode, circuitry, data, databases, data structures, tables, arrays, and variables.

In general, the word "module," as used herein, refers to logic embodied in hardware or firmware, or to a collection of software instructions possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

Figure 8:
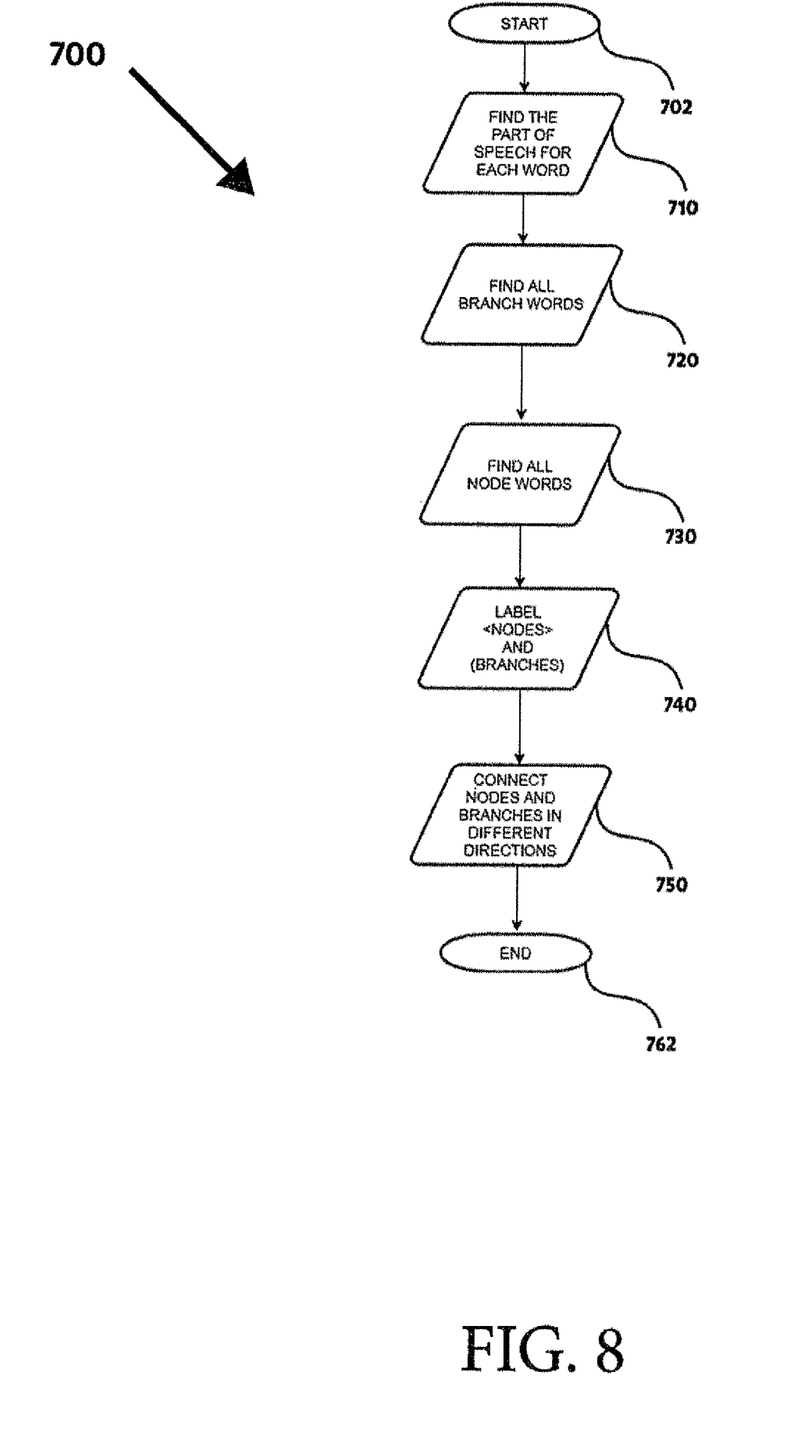
FIG. 8 is a program flow diagram depicting a method of processing, including processing each sentence, according to the inventive three-dimensional model.

FIG. 8 presents an alternative embodiment of a method of processing a first or source natural language text to realize a translation to a second or target natural language text, in accordance with the multidimensional synapper model and inventive principles. After start (represented by element identifier 702), the processor processes each sentence of the source text for translation, to determine or characterize each word therein, i.e., which word is which "part" of speech. This step is represented by element identifier 710. Next, the sentence is further processed to find and identify each branch word, according to the inventive principles. This step is represented by element identified 720. Next, the processor further processes to identify all node words, in a step represented by element identifier 730. Next, all nodes and branches are labeled, in a step identified by element identifier 740. The processor then connects the nodes and branches in different directions, in the step identified with element identifier 750. The process ends at a step 762.

A computer program listing appendix was submitted on compact disc in compliance with 37 CFR 1.52(e). The computer program listing appendix is a text document identified as: synapper_modeler_computer_program_listing appendix. The subject matter of the computer program listing appendix is incorporated by reference herein. The computer program listing appendix was created Jan. 21, 2020 and has a size of 429 KB and a size on disk of 432 KB.

Although the foregoing has been described in terms of certain specific embodiments, other embodiments will be apparent to those of ordinary skill in the art from the disclosure herein. Moreover, the described embodiments have been presented by way of example only, and are not intended to limit the scope of the disclosure. Indeed, the novel processes and systems described herein may be embodied in a variety of other forms without departing from the spirit thereof. For example, any of a variety of data structures or combinations of various data structures can be used for storage and processing of the multi-dimensional natural language parsing system, its objects, and the like. While a graph structure was described to illustrate meaning world representations of text being processed, matrices, linked lists, and records are a few examples of data structures that could implement the same idea.

Accordingly, other combinations, omissions, substitutions, and modifications will be apparent to the skilled artisan in view of the disclosure herein. In addition, the language independency of the meaning world may advantageously be completely, substantially, or only moderately independent of any particular language, or include one or more languages native thereto.

I claim:

1. A method for translating text written or articulated in a source natural language, to a target natural language, in reliance upon a multidimensional sentence model, the method comprising:
separating the text written or articulated in the source natural language into sentences comprised of words;
determining a part of speech for each of the words within the sentences;
defining each of the words as a branch or a node based on the part of speech of each of the words and parts of speech of neighboring words within the sentences;
generating a multidimensional sentence model for each of the sentences, the multidimensional sentence model representing the nodes as connected to one another in a first direction and the branches as connected to corresponding nodes in any of multiple directions other than the first direction;
and
processing the multidimensional sentence model for each of the sentences to generate a translated sentence in the target natural language.

2. The method according to claim 1, wherein the step of parsing includes, for each of the words, searching lexical databases to accurately determine the part of speech for each of the words within the sentences.

3. The method according to claim 2, wherein searching the lexical databases includes implementing a search engine to search publicly available databases.

4. The method according to claim 1, wherein the step of parsing includes, finding each of the words in accessible vocabulary databases, to secure an understanding of the part of speech for each of the words.

5. The method according to claim 4, wherein nouns are determined to be branches if a next word is also a noun.

6. The method according to claim 4, wherein adjectives are determined to be branches if a next word is a noun, a pronoun, or another adjective.

7. The method according to claim 4, further comprising assigning numbers to the words.

8. The method according to claim 1, further comprising determining the sentence type of each of the sentences based on the representation of the nodes within the multidimensional sentence model of each of the sentences.

9. The method according to claim 1, wherein processing the multidimensional sentence model includes traversing the representation of the sentences in different directions based on the target natural language.

10. The method of claim 1, wherein determining which of the words are branches includes defining words that are determiners as branches except when the last words of the sentence, defining words that are nouns as branches when a next word is also a noun, defining words that are adjectives as branches when the next word is a noun, a pronoun, or another adjective except when the last words of the sentence, and defining words that are adverbs as branches when the next word is an adjective or another adverb except when the last words of the sentence.

11. The method of claim 10, wherein determining which of the words are nodes includes defining all words that are not branches as nodes.

12. A method for translating a work written or otherwise articulated in a source natural language text into a target natural language text, in reliance upon a multidimensional sentence model, comprising the steps of:
separating the work written or otherwise articulated in the source natural language text into sentences comprised of words;

determining which of the words are branches and which are nodes based on parts of speech of each of the words and parts of speech of neighboring words within the sentences;

parsing each of the sentences in the source natural language text in accordance with the multidimensional sentence model, including the nodes connected to one another in a first direction and the branches connected to corresponding nodes in any of multiple directions other than the first direction; and processing the multidimensional sentence model for each of the sentences to create translated sentences in the target natural language text, wherein each translated sentence accurately reflects the sentences in the target natural language text.

13. A natural language translation system, comprising:

a processor; and an I/O device for inputting and/or outputting works natural language text;

an application program, operational in the processor, that receives and processes a work written or otherwise communicated in a source natural language, to realize a number of sentences comprised of words, then determines which of the words are branches and which are nodes based on parts of speech of each of the words and parts of speech of neighboring words within the sentences, then parses the sentences according to a multidimensional sentence model, including the nodes connected to one another in a first direction and the branches connected to corresponding nodes in any of multiple directions other than the first direction, and then generates corresponding sentences in a target natural language according to the multidimensional sentence model.

14. The natural language translation system according to claim 13, wherein the corresponding sentences comprise a translation of the work in the target natural language.

15. The natural language translation system according to claim 13, further comprising one or more databases including data on the words used in the sentences in the source natural language, the target natural language or both.

16. The natural language translation system according to claim 13, further comprising a device for translating a spoken word into a textual work for translation from a source natural language of the textual work into a target natural language of the textual work.

17. The natural language translation system according to claim 16, wherein the device for translating processes a work translated into a target natural language and generates sounds that articulate the translated work into spoken words of the target natural language.

* * * * *